US011586373B2

(12) United States Patent
Bruckner et al.

(10) Patent No.: US 11,586,373 B2
(45) Date of Patent: *Feb. 21, 2023

(54) ARCHIVE CENTER FOR CONTENT MANAGEMENT

(71) Applicant: OPEN TEXT SA ULC, Halifax (CA)

(72) Inventors: Thomas Bruckner, Günzburg (DE); Matthias Specht, Gröbenzell (DE); Nicholas Carter, Luxembourg (LU)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/380,565

(22) Filed: Jul. 20, 2021

(65) Prior Publication Data

US 2021/0349654 A1 Nov. 11, 2021

Related U.S. Application Data

(63) Continuation of application No. 15/343,686, filed on Nov. 4, 2016, now Pat. No. 11,086,547.

(60) Provisional application No. 62/252,044, filed on Nov. 6, 2015.

(51) Int. Cl.
*G06F 16/30* (2019.01)
*G06F 3/06* (2006.01)
(Continued)

(52) U.S. Cl.
CPC .......... *G06F 3/0649* (2013.01); *G06F 3/0605* (2013.01); *G06F 3/067* (2013.01);
(Continued)

(58) Field of Classification Search
CPC .... G06F 16/113; G06F 3/0649; G06F 16/217; G06F 16/93; G06F 16/125; G06F 16/252; G06F 3/0605; G06F 3/067
See application file for complete search history.

(56) References Cited

U.S. PATENT DOCUMENTS 7,213,040 B1 * 5/2007 Stokes ................. G06F 16/10
707/999.203
2011/0035356 A1 2/2011 Vukojevic
(Continued)

OTHER PUBLICATIONS

Article entitled "OpenText File System Archiving", by OpenText, Copyright 2010 (Year: 2010).*
(Continued)

*Primary Examiner* — Mahesh H Dwivedi
(74) *Attorney, Agent, or Firm* — Sprinkle IP Law Group

(57) ABSTRACT

Content is captured and archived at an archive center (AC) and, depending upon records management (RM) policy, is managed by the AC or under RM control by a content server (CS). Both the AC and CS may be part of an enterprise content management system. The AC provides a user-friendly interface through which retention zones may be defined, and functionality for applying RM policy. The functionality can be triggered via a specific content property or through a retention zone under RM control. The RM control can be turned on or off from within the AC using the user-friendly interface. Archived content is not moved or duplicated. Rather, metadata and a link to the storage location are sent to the CS which, in turn, creates a content server document that is linked to the archived content. Only a portion of archived content is exposed to the CS through the AC.

20 Claims, 8 Drawing Sheets

(51) Int. Cl.
G06F 16/21 (2019.01)
G06F 16/25 (2019.01)
G06F 16/11 (2019.01)
G06F 16/93 (2019.01)
(52) U.S. Cl.
CPC .......... *G06F 16/113* (2019.01); *G06F 16/125* (2019.01); *G06F 16/217* (2019.01); *G06F 16/252* (2019.01); *G06F 16/93* (2019.01)

(56) References Cited

U.S. PATENT DOCUMENTS

| | | | |
|---|---|---|---|
| 2012/0030180 | A1 | 2/2012 | Klevenz et al. |
| 2015/0006957 | A1 | 1/2015 | Ginzinger et al. |
| 2017/0131944 | A1 | 5/2017 | Bruckner et al. |
| 2022/0286346 | A1 | 9/2022 | Evans |

OTHER PUBLICATIONS

European Search Report issued for European Patent Application No. 16197352.4, dated Feb. 16, 2017, 13 pages.
Anonymous: "OpenText Archive Server Functional Paper," Nov. 30, 2014, pp. 1-22, XP055341357, [retrieved on Feb. 22, 2017 <<http://mimage.opentext.com/alt content/binary/pdf/opentext-archive-server-10-5-functional-paper.pdf>>].
Anonymous: "Why Archiving Matters: How to Manage Your Enterprise Content with OpenText Archive Server," Jan. 31, 2010, pp. 1-54, XP055341362, [retrieved on Feb. 2, 2017 <<http://www.opentext.com/file_source/OpenText/en_US/PDF/OpenText Archive Server Whitepaper ( Why Archiving Matters).pdf>>].
Anonymous: OpenText Archive for GoogleApps, Dec. 31, 2013, pp. 1-4, XP055341359, [Retrieved on Feb. 2, 2017 <<http://www.opentext.com/filesource/OpenText/enUS/PDF/01449-PO-Archiving-for-Google-Apps-FINAL.pdf>>].
Examination Report issued for European Patent Application No. 16 197 352.4, dated Dec. 5, 2017, 11 pages.
Examination Report issued for European Patent Application No. 16 197 352.4, dated May 11, 2018, 11 pages.
Office Action issued for U.S. Appl. No. 15/343,686, dated Apr. 2, 2019, 18 pages.
Office Action issued for U.S. Appl. No. 15/343,686, dated Aug. 8, 2019, 23 pages.
Notice of Allowance issued for U.S. Appl. No. 15/343,686, dated Apr. 6, 2021, 17 pages.
Zhu etal, "Creating Value-Based Archiving Solutions with IBM Content Collector," Jan. 2013, 312 pages.

* cited by examiner

ARCHIVE CENTER FOR CONTENT MANAGEMENT

CROSS-REFERENCE TO RELATED APPLICATION(S)

This application is a continuation of and claims a benefit of priority under 35 U.S.C. 120 of the filing date of U.S. patent application Ser. No. 15/343,686, filed Nov. 4, 2016, issued as U.S. Pat. No. 11,086,547, entitled "ARCHIVE CENTER FOR CONTENT MANAGEMENT," which is a conversion of, and claims a benefit of priority from U.S. Provisional Application No. 62/252,044, filed Nov. 6, 2015, entitled "ARCHIVE CENTER FOR CONTENT MANAGEMENT," which is fully incorporated by reference herein for all purposes.

TECHNICAL FIELD

This disclosure relates generally to content management. More particularly, embodiments disclosed herein relate to systems, methods, and computer program products for processing and archiving content and selectively exposing archived content to enterprise content management workspaces.

BACKGROUND OF THE RELATED ART

Modern enterprises and companies alike utilize archive servers to electronically archive their content for various reasons, including meeting regulatory requirements. For example, in the United States, an employer is required to preserve for at least three years payroll records, collective bargaining agreements, sales and purchase records, etc.; the Internal Revenue Service requires all records of employment taxes be kept for at least four years; and the Health Insurance Portability and Accountability Act of 1996 (HIPAA) requires a 6-year retention period for protected health information (PHI) such as patients' medical records and other personal health information.

To this end, some enterprise content management systems such as the Enterprise Content Management (ECM) suite available from Open Text S.A. include archive servers to facilitate automating the management of record archiving and retention policies. As an example, the ECM Archive Server can securely store valuable content in an unalterable and tamperproof form over a long period of time, while allowing for quick and easy retrieval, sharing, forwarding, and reuse of content. One reason for retrieving archived data is to meet audit requests or a legal discovery request in the event of pending litigation or the threat of litigation. The archiving solution provided by the ECM Archive Server can, through various services that it provides, secure the accessibility and readability of content during the entire lifecycle and, through replication and distribution, protects it from loss in the event of disaster. Examples of services provided by the ECM Archive Server may include those for taking in content, for integrating content into enterprise applications, and for securing and auditing content and its access. Examples of enterprise applications may include enterprise resource planning (ERP) software; groupware systems; e-commerce software such as back-office systems; or standalone applications.

A typical ECM system comprises a stack or collection of software subsystems or components (referred to herein as an ECM software stack) that work together to produce a result or complete a particular task. Depending upon needs, components in an ECM software stack may vary from system to system. As an example, an ECM software stack may include document capture, records management, workflow, search, email, fax, social media, eDiscovery, archiving, etc. Data received from an enterprise application is usually pushed through a complete ECM software stack, leaving a footprint at every layer. At the end of this journey, a decision is then made as to where and what should be archived. While this approach works for many scenarios, further improvements may be desired.

SUMMARY OF THE DISCLOSURE

Today, various computer technologies are used within enterprises and companies alike. These technologies produce massive amounts of content, including scanned documents, faxes, emails, search results, office documents, social media content, etc. As discussed above, an enterprise may employ an ECM system to manage and archive content. However, not all of the information communicated from enterprise applications to an ECM system may be relevant for enterprise operations. Indeed, in some cases, only about 10 percent of the information processed by an ECM system may be relevant for ECM purposes. Furthermore, not all of the information processed by an ECM system may need to be placed under records management (RM) control for regulatory and/or compliance purposes.

While indiscriminately collecting all of the documents via an ECM system (and hence placing everything under control of the ECM system) may address the need to meet regulatory requirements, the ECM system is invariably burdened with a lot of information that may have minor or no relevance, severely affecting the usability and/or performance of the ECM system. For example, performing a search via the ECM system may return a tremendous amount of irrelevant hits (search results) which, in turn, can lead to frustrating user experience.

An object of this disclosure is to provide a new archiving solution that can improve the usability and/or performance of an ECM system while meeting the regulatory and/or compliance requirements. This and other objects can be achieved in embodiments disclosed herein that implements a new approach to processing and archiving content. Specifically, embodiments provide systems, methods, and computer program products for efficiently and effectively archiving content and selectively exposing ("bubbling up") only a portion thereof to other components of an ECM system such as content server(s).

An exemplary embodiment can be summarized as follows. Content is captured and archived at an archive center (AC) and, depending upon records management (RM) policy, is managed by the AC or under RM control by a content server (CS). Both the AC and CS may be part of an enterprise content management system. The AC provides a user-friendly interface through which retention zones may be defined, and functionality for applying RM policy. The functionality can be triggered via a specific content property or through a retention zone under RM control. The RM control can be turned on or off from within the AC using the user-friendly interface. Archived content is not moved or duplicated. Rather, metadata and a link to the storage location are sent to the CS which, in turn, creates a content server document that is linked to the archived content. Only a portion of archived content is exposed to the CS through the AC.

In some embodiments, a method for archiving content (e.g., enterprise content in an enterprise computer network environment) may be implemented by an archive center application embodied on one or more server machines (collectively referred to herein as an "archive center." The archive center may be configured to receive content from an application (e.g., an enterprise application that runs on at least one server machine operating in the enterprise computer network environment). The archive center may examine the content and extract or otherwise obtain metadata associated with the content. The archive center may determine, based at least in part on the metadata, whether to retain or relinquish control of the content. In this context, retaining control of the content means that it is the archive application which is responsible for managing retention of the content. Moreover, relinquishing control over the content means that the archive application is not responsible for managing retention of the content and, instead, the manner in which the content is retained is managed by a contents server, possibly under records management control. In this case, the contents may still be stored at an archive center. Either way, the content can be archived at a secure storage location of a data store in an unalterable and tamperproof form. The data store is maintained by the archive center.

The metadata, which may comprise a plurality of properties defined per document type, may include a special content property indicating an RM policy. This property can directly trigger the archive center to send the metadata and a link to the storage location of the archived content to a content server. This process is referred to herein as "bubbling up" or "exposing" the archived content outside of the archive center. The archive center effectively relinquishes control of retention of the content when a property associated with the content indicates that an RM policy is applicable to the content.

Another way to "bubble up" or "expose" the archived content outside of the archive center is an indirect one. In some cases, a document (which is used herein as an example type of content) may be tagged to be placed in a retention zone. The archive center provides a user-friendly interface through which various retention zones may be defined, configured, and managed. In some embodiments, the user-friendly interface of the archive center enables an administrative user to turn on or off or otherwise configure RM control for a retention zone in the archive center. Thus, when a document is tagged for a retention zone and that retention zone is configured to be under the RM control, placing the document in the retention zone will indirectly trigger the archive center to send the metadata and a link to the storage location of the document to a content server.

In this way, the archive center can expose only a portion of the content captured at the archive center that may be relevant for RM purposes and may only need to manage retention of the content if control of the content is retained by the archive center. This new approach can drastically reduce the load placed on the overall ECM system, increase usability and performance of the ECM system, while still meeting the regulatory/compliance requirements for records management.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 5A-5D depict diagrammatic representations of an example of a graphical user interface of one embodiment of an archive center.

FIGS. 6A-6B depict diagrammatic representations of another example of a graphical user interface of one embodiment of an archive center.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
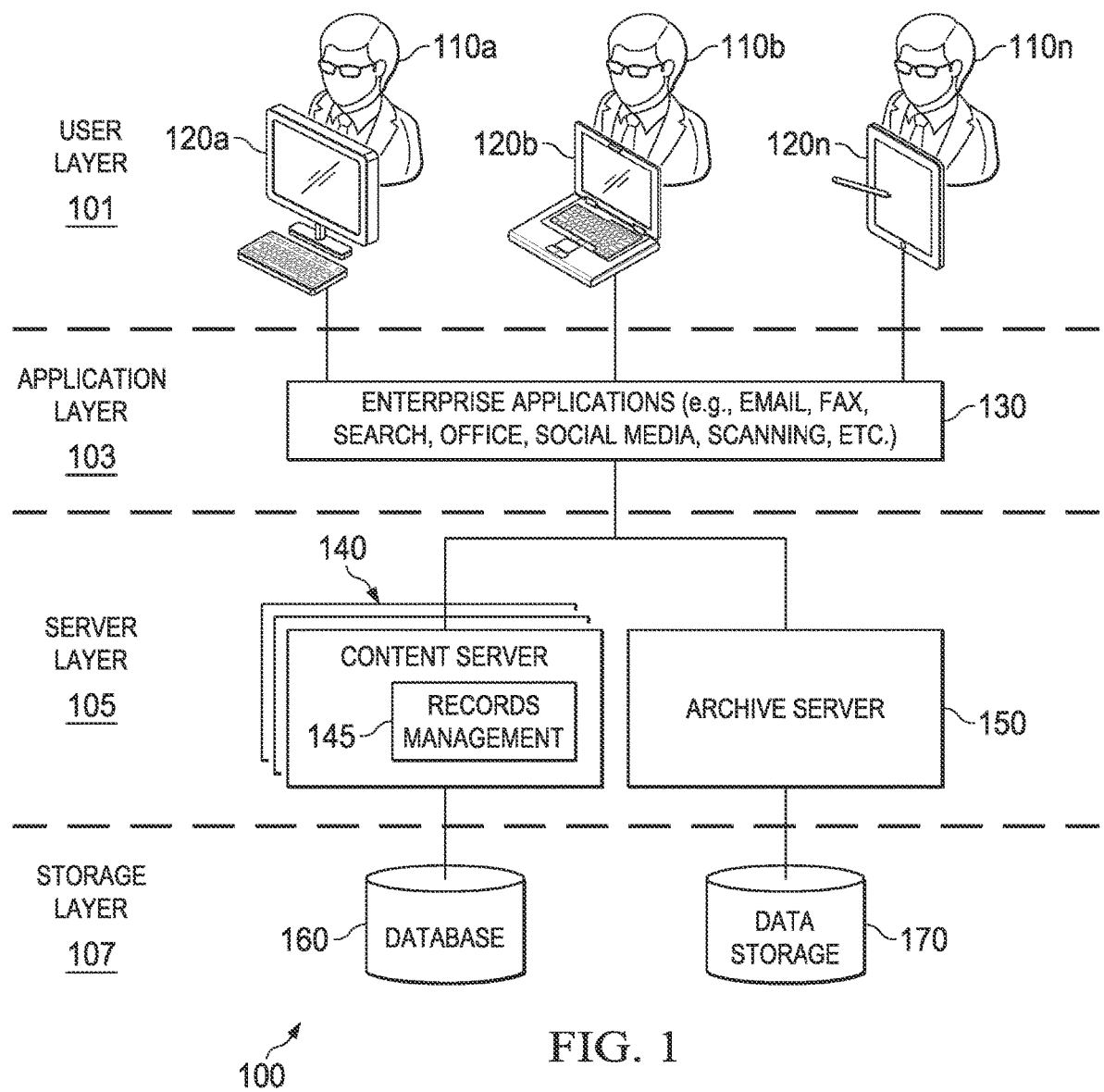
FIG. 1 depicts a diagrammatic representation of an example approach of enterprise content management.

FIG. 1 depicts a diagrammatic representation of an example approach of enterprise content management using a typical enterprise content management (ECM) system 100 having user layer 101, application layer 103, server layer 105, and storage layer 107. At user layer 101, users 110a, 110b, ... 110n may utilize enterprise applications 130 (e.g., email software, fax software, search software, office software suite, social media programs, scanning programs, etc.) through various computing devices 120a, 120b, ..., 120n in performing their job functions within an enterprise. Enterprise applications 130 at application layer 130 may collect data and communicate the collected data with backend component systems of ECM system 100 at server layer 105, including content server 140 and archive server 150. Enterprise applications 130 are highly complex software systems. Scalable, distributed, component-based, and often mission-critical, enterprise applications 130 may be deployed on a variety of platforms across enterprise networks, intranets, or the Internet. They are data-centric, user-friendly, and must meet stringent requirements for security, administration, and maintenance.

Skilled artisans appreciate that the term ECM encompasses strategies, methods, and tools used throughout the lifecycle of information relating to an enterprise's processes (e.g., documents and various other types of content created or used in an enterprise's processes, collectively referred to herein as "enterprise content," "content," or "data" interchangeably). The lifecycle of content in this context may begin from the initial publication or creation all the way through archival and eventually disposal. Thus, ECM can be an umbrella term that broadly covers document management, Web content management, search, collaboration, records management, digital asset management (DAM), workflow management, capture and scanning.

In the example illustrated, content server 140 includes records management component 145 configured to provide records management functions and capabilities for full lifecycle document and record management for an operator of ECM system 100. Features of records management component 145 can be embedded in the interfaces of applications 130, enabling users 110a, 110b, ..., 110n to access records management functions in the interface that they are most familiar with. For example, from within an email program, a right click on an email may invoke an embedded records management function that can be used to classify the email on-the-fly. Upon the classification, metadata and retention rules can be applied and the email can be retained in, for example, database 160 at storage layer 107.

In the above example, retention management is performed by an enterprise application which accesses a retention handling function of archive server 150. The enterprise application can specify a retention period (and a retention behavior) during the creation and migration of a document. If nothing is specified, a default period and behavior is used, configured per logical archive (which is persisted at data storage 170). Archive server 150 handles retention periods and keeps track of all changes on document content. A retention period may be fixed for a logical archive. This means that all documents written to this logical archive inherit the fixed retention period configured, which is set to start with the date of archival. Documents (e.g., invoices and tax related documents) with the same retention requirements can be sent to the same logical archive configured with the particular retention period. An enterprise application can prolong a retention period and any change in this regard can be propagated down to storage layer 107. Meanwhile, records management component 145 can handle classification, retention management, audit trails and deletion of documents.

The above-described approach allows the operator of ECM system 100 to archive content according to internal policies, ensuring regulatory compliance, and reducing risks associated with audit and litigation. In an example implementation, all data (100%) from enterprise applications 130 are communicated to content server 140 as well as to archive server 150. Although a single archive server 150 is shown in FIG. 1, skilled artisans appreciate that ECM system 100 may include multiple archive servers 150. One advantage of this approach is that every piece of incoming data is treated the same and features/functions of ECM system 100 are available for all data. Another advantage is that every piece of data can be directly accessed with ECM system 100 (e.g., via workspaces). However, this also means that every piece of incoming data must pass the most sophisticated/complex ECM software stack which is responsible for the user interactions as well. This requires ECM system 100 to make available huge system resources. Such a load placed on ECM system 100 may affect the data ingestion performance. Furthermore, every piece of incoming data leaves a footprint within the ECM software stack. This can fill up the databases in different layers.

Figure 2:
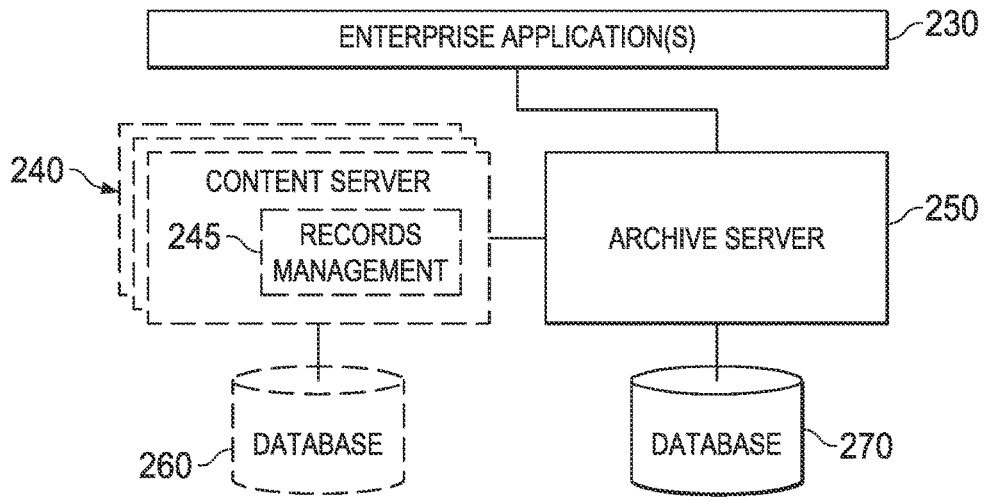
FIG. 2 depicts a diagrammatic representation of another example approach of enterprise content management.

As data volumes continue to grow, it is desirable to reduce the enormous efforts that an ECM system must undertake to manage and control data. Recognizing that the vast majority of data entering into an ECM system may not be relevant and/or need to be archived, FIG. 2 depicts a diagrammatic representation of another example approach of enterprise content management where data from enterprise applications 230 are first directed to archive server 250 of ECM system 200 and archived there, for instance, in database 270. An archivist or administrator may define, via an archive center (which, in some embodiments, may have a web-based user interface), which documents (e.g., types of content) should be made known with the higher level ECM software stack (referred to herein as the ECM workspace and including content server 240, records management 245, etc.) of ECM system 200. In this way, only relevant documents are forwarded to the ECM workplace, reducing the footprint for ECM workspace database 260, allowing the possibility of smaller systems, improving the relevancy of search results, and enhancing the user experience. The forwarding can be done asynchronously to avoid peak loads in the ECM upper layers.

Using metadata associated with each piece of data, a decision can be made by archive server 250 as to which documents have to be "bubbled up" to (i.e., exposed in) the ECM workspace. As shown in FIG. 2, in some embodiments, all data (100%) from enterprise applications 230 are first processed by archive server 250 and 0-100% of the processed data may then be communicated by archive server 250 to the ECM workspace (which is represented by content server(s) 240 in FIG. 2). An example of this process is explained below with reference to FIG. 3.

Specifically, in some embodiments, an archive center is included in an ECM system to handle the archiving and mediate between the archive and ECM solutions. Such an archive center allows for definition of relevant data that are then exposed ("bubbled up") to the ECM workspace.

Figure 3:
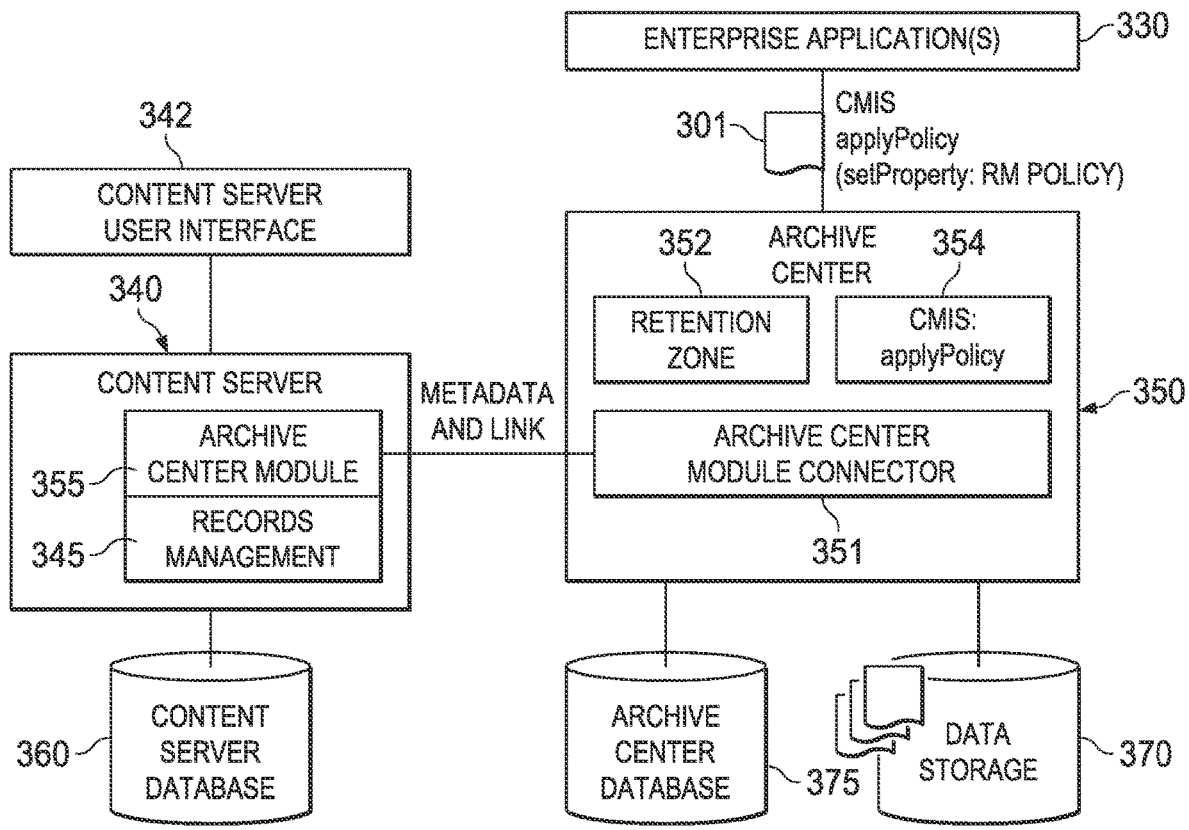
FIG. 3 depicts a diagrammatic representation of one example of an enterprise content management system having an archive center according to some embodiments.

In the example illustrated in FIG. 3, archive center 350 may be implemented as an archiving application that is part of ECM system 300 which also includes content server 340. Because of the focus on archiving, archive center 350 may only provide basic retention management which controls how long documents are stored. For some documents, basic retention management may not be sufficient because certain documents must be under records management control (e.g., for regulatory/compliance reasons). As discussed above, previously, the only way to leverage records management is to store everything in a content server which is not designed as an archiving application and which does not provide archiving services. With the new functionality, it would be possible to select the documents on an archive center level and decide if this is a document which must only be archived or must also be under records management control.

In some embodiments, there are at least two ways to put a document under records management control:

Retention Zone 352: This is a feature provided by archive center 350 to apply different retentions to different documents. This feature can be extended to place a document (e.g., document 301 from enterprise application 330) under control of records management 345 if retention management is not sufficient for this particular document.

applyPolicy Call 354: This is a feature provided by archive center 350 to make an explicit application programming interface (API) call to a document after it is archived to place it later under control of records management 345. With this call, it would be possible to have a user interaction (e.g., via a user interface generated within archive center 350 and presented to the user on the user's device) to make this decision. This functionality can be very important because it enables the new approach to first archive everything in data storage 370 and then decide later with regard to records management control. This could be done by an end user using an enterprise application which is integrated into archive center 350 or any other client that implements the Content Management Interoperability Services (CMIS) interface. CMIS is an open standard that allows different content management systems to inter-operate over the Internet.

Technically, all data from enterprise applications 330 would be communicated to archive center 350 and, if a document should also be under records management control, the metadata associated with the document would be uploaded by archive center module connector 351 to archive center module 355 at content server 340 together with a link or reference to the archived content (e.g., via an object identifier or ObjectId). Archive center module connector 351 refers to a software connector particularly configured for connecting to and communicating with archive center module 355, which functions as an agent for archive center 350.

As an example, suppose document 301 is archived by archive center 350 and also under control of records management 345, document 301 would physically reside at data storage 370 and a corresponding content server (CS) document (which can be a proxy object created based on the metadata associated with document 301 and containing the ObjectID for document 301) would reside at content server database 360 with a link to a storage location of document 301 at data storage 370. In this way, the same document 301 would be accessible via content server user interface 342 of content server 340 and any appropriate interface to archive center 350.

In some embodiments, archive center database 375 may store information used by archive center 350 to perform archiving functions. As a non-limiting example, a standard document type in archive center 350 may provide the following properties (also referred to as metadata or attributes). Values for these properties can be provided by a client or generated implicitly by a server.

Change Token
Checkin Comment
File Name
Stream Id
Content Length
Mime Type
Created By
Creation Date
Description
Immutable
Is Latest Major Version
Is Latest Version
Is Major Version
Private Working Copy
Checked Out
Modification Date
Modified By
Name
Object Id
Type-Id
Secondary Type Ids
Version Label
Checked Out By
Checked Out Id
Version Series Id
Archive Server Document Checksum
Archive Server Document Component Name
Datasource Id
Archive Server Document Identifier
Tags A tag in this disclosure refers to a rule defined based on metadata. Tagged documents can be assigned for further processing (e.g., setting a retention period). Tags can be used to define what document is to be made known within the ECM workspace, indirectly triggering a new "applyPolicy" functionality. This is further explained below.

In some embodiments, a new property "RM Policy" is provided to directly trigger the upload to control the records management functionality. This new property is configured to trigger the new "applyPolicy" functionality and instruct archive center 350 that a document is to be controlled by records management 345 (which is part of content server 340). All this can be done via the standard CMIS interface without any further additions. In some embodiments, it may be sufficient to provide the information that the document must be uploaded to content server 340 (e.g., by configuring a document's RM classification to inherit from a folder where the document is placed). For complex scenarios, the RM classification can be added to this "RM Policy" property and it will be applied during the upload to content server 340.

As shown in FIG. 3, there are two ways to trigger the applyPolicy functionality: indirectly via a retention zone or directly with a CMIS call. Technically, both ways would be based on the same technique internally. The CMIS applyPolicy call would be a setProperties call which provides the information for the property "RM Policy." In some embodiments, a backend implementation (e.g., archive center module connector 351) is configured to recognize this trigger and, in response, upload the document of interest to its counterpart (e.g., archive center module 355) at content server 340 and set the document under records management control.

In some embodiments, upload to content server 340 can be done via a REST API call. The essential functionality is that CS documents can be created with just a link to the existing content and only the metadata together with the required information for records management are provided to content server 340. This eliminates the need to physically moving vast amounts of data from content server 340 to archive center 350 and vice versa.

Figure 4:
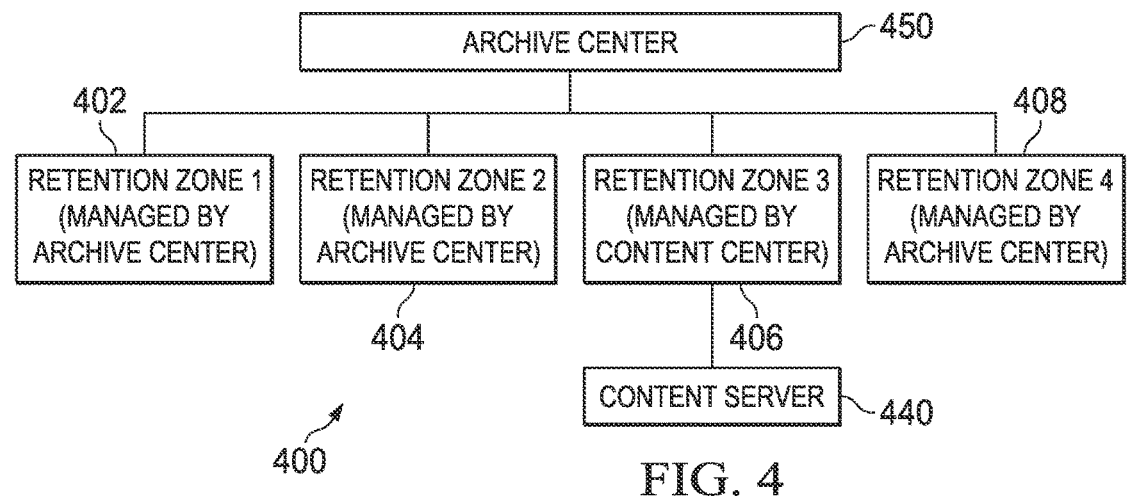
FIG. 4 depicts a relationship diagram illustrating control of an archiving process through flexible retention zones according to some embodiments.

If a document is put to a retention zone which is configured to be under records management control, the placement of that document into the particular retention zone (e.g., via a tag) would indirectly trigger the same call for all documents in this zone. As illustrated in FIG. 4, this allows for a flexible control of an archiving process through retention zones.

For example, ECM system 400 may comprise content server 440 and archive center 450. Documents received or otherwise captured by archive center 450 can be classified or otherwise filtered into different retention zones 402, 404, 406, and 408, for instance, based on a user-specified collection, data source, or tagging rule. In the example illustrated, retention zones 402, 404, and 408 may be managed by archive center 450, while retention zone 406 may be managed by content server 440. As explained above, only when a document is placed in retention zone 406 will the applyPolicy functionality be triggered to upload the document to content server 440.

Figure 5A:
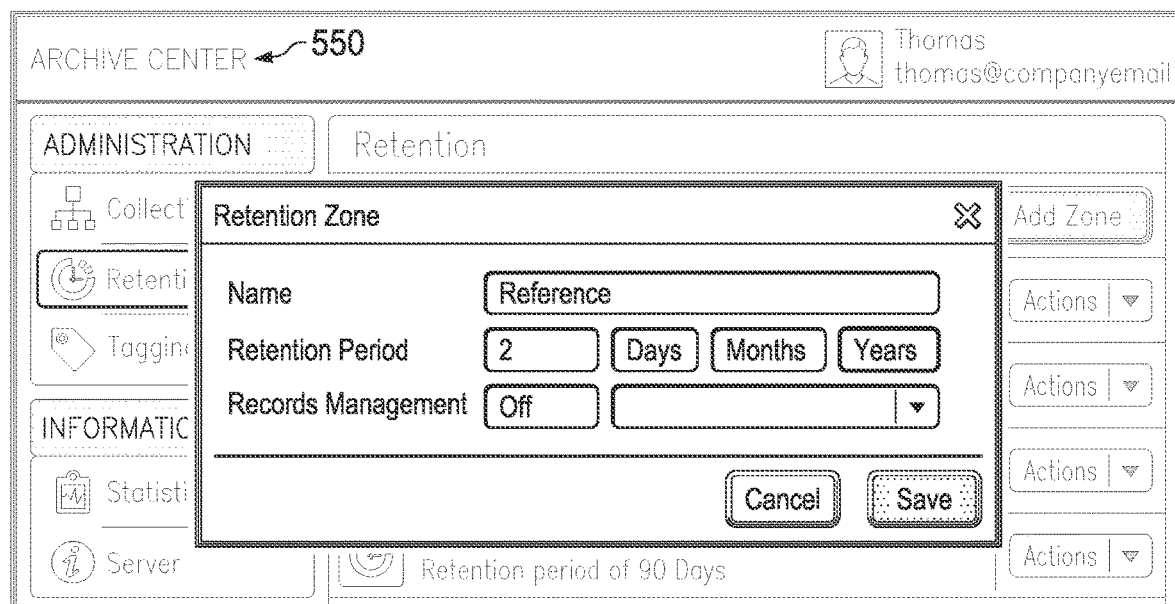
Figure 5B:
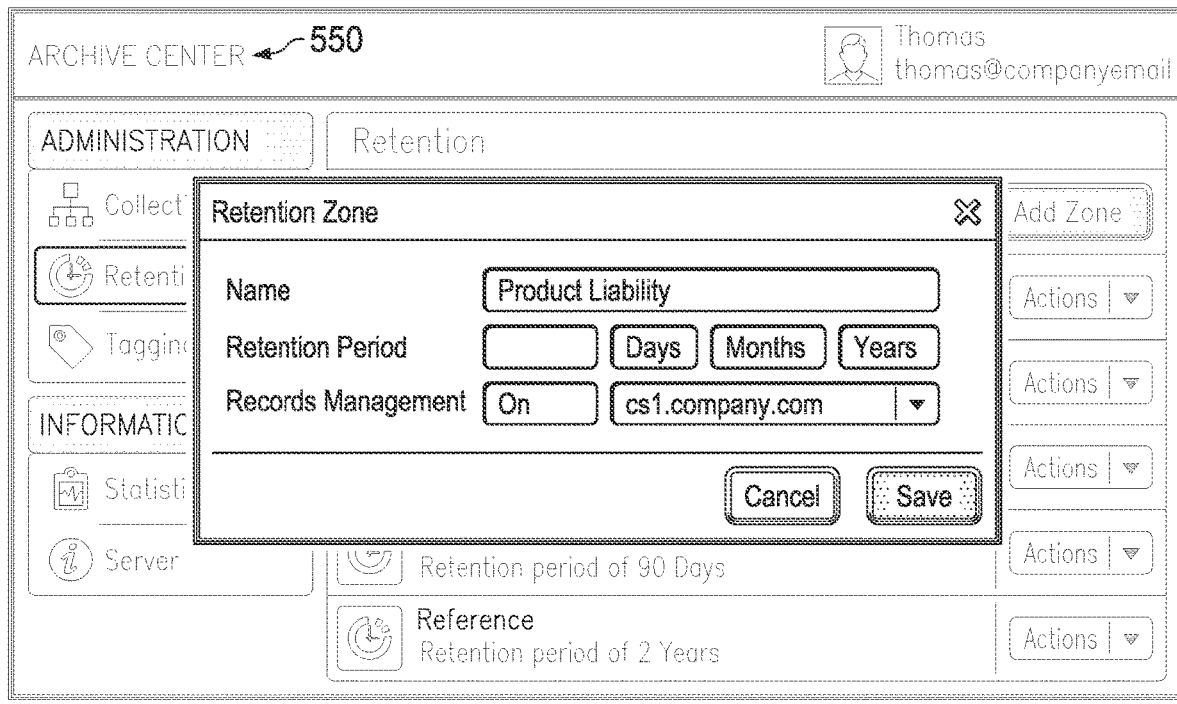
Figure 5C:
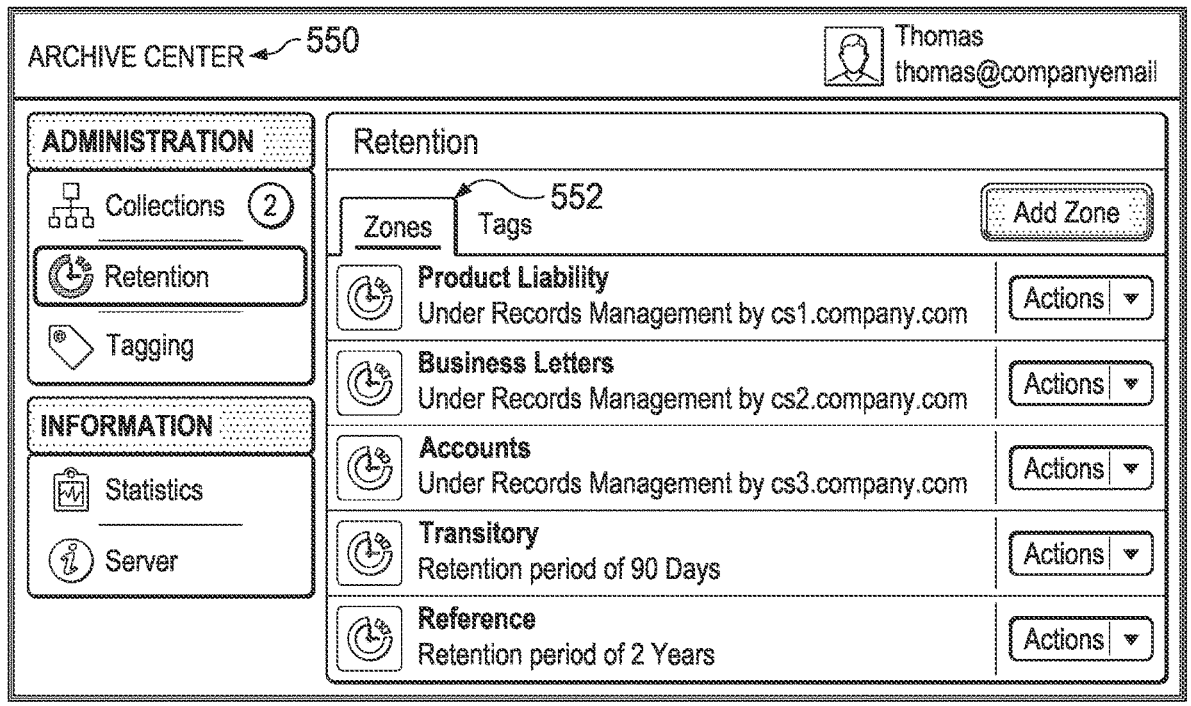
Figure 5D:
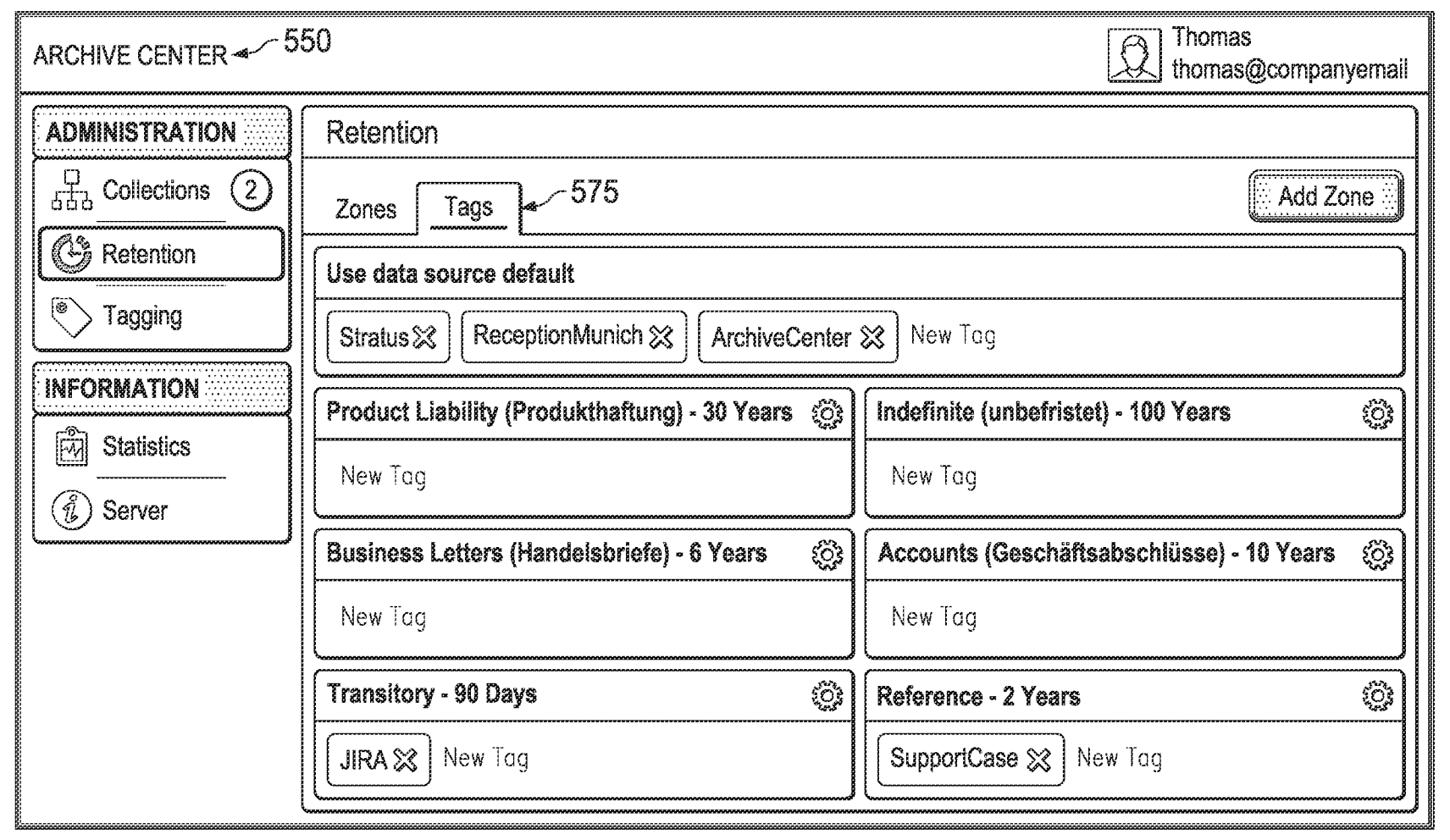

FIGS. 5A-5D depict diagrammatic representations of an example of a graphical user interface of one embodiment of archive center 550. Specifically, FIGS. 5A and 5B show how control of records management may be turned on or off for a retention zone. In the example of FIG. 5A, control of records management is turned off for a retention zone named "Reference" and a retention period is set to two years. In the example of FIG. 5B, control of records management is turned on for a retention zone named "Product Liability" and, since archive center 550 will not be managing this retention zone, the retention period is left blank. Instead, the retention zone "Product Liability" is specified to be under the control of a content server at a network address "cs1.company.com". FIG. 5C shows various retention zones 552 of archive center 550, some of which are under records management control by different content servers and some of which are managed by archive center 550 with varying retention periods. FIG. 5D shows examples of tags 575 that can be used to filter documents into various retention zones. For example, all files containing a "SupportCase" tag may be placed in the "Reference" retention zone and retained for a period of two years. Notice that the "Product Liability" retention zone, which is under records management control by a content server, has a retention period of 30 years per a records management policy.

Figure 6A:
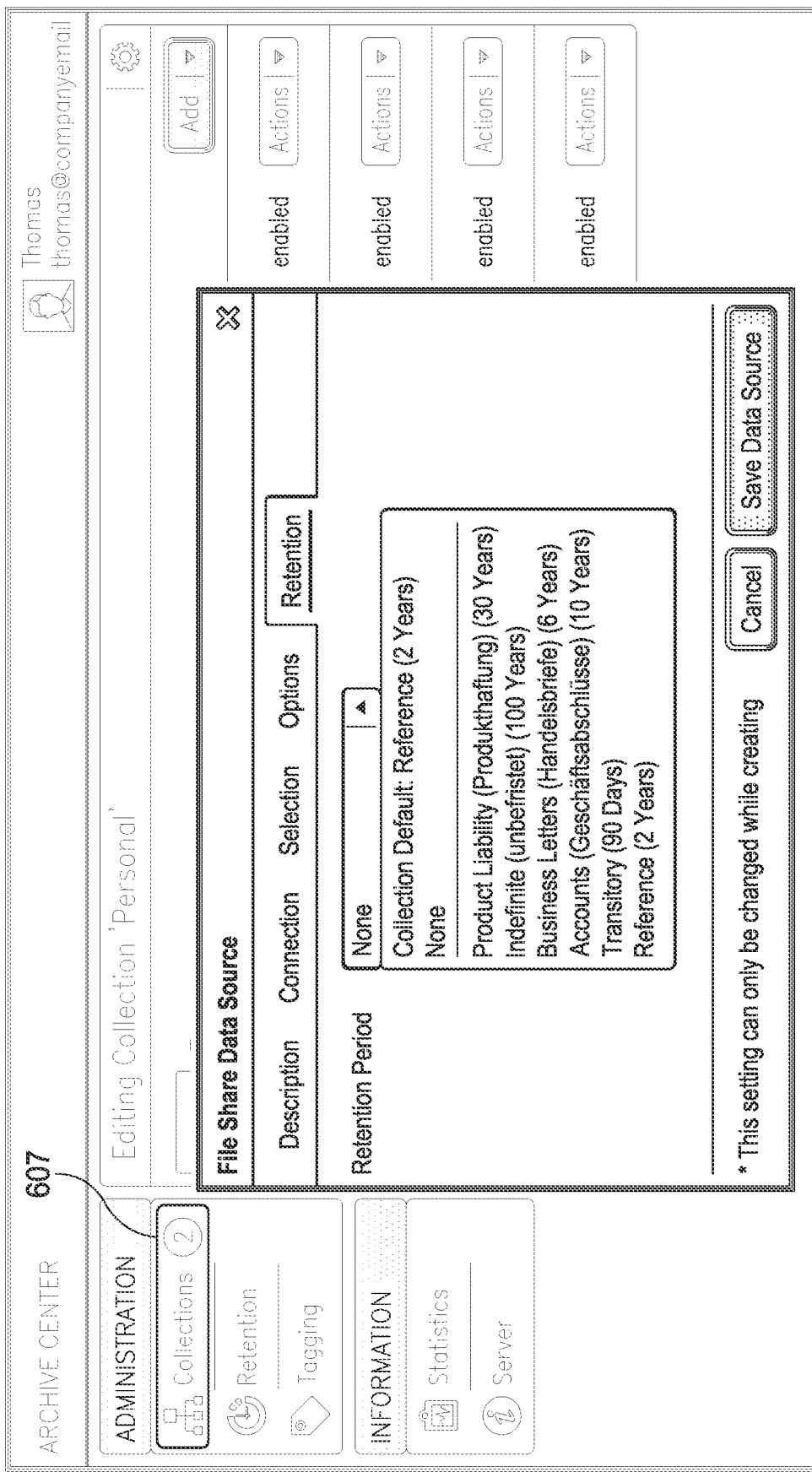
Figure 6B:
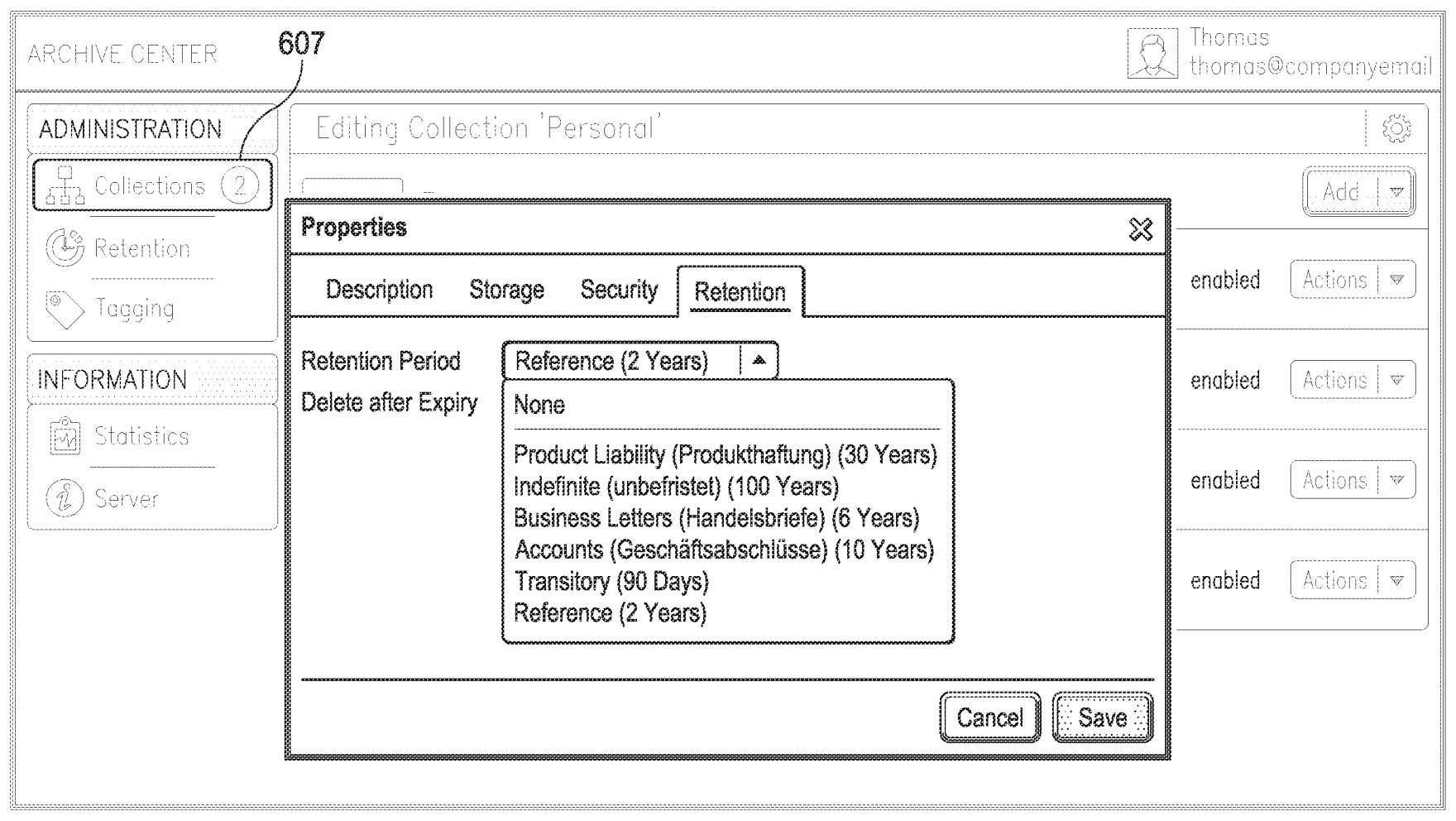

FIGS. 6A-6B depict diagrammatic representations of another example of a graphical user interface of one embodiment of an archive center disclosed herein. As illustrated, an administrative user can create a collection for easy and quick access to archived data of interest, using feature 607 provided by the archive center via the graphical user interface. This "collection" feature 607 allows the user to filter archived data per data source, retention zone, etc., and take appropriate action such as instructing the archive center to delete documents retained in a particular retention zone after the retention period.

Figure 7:
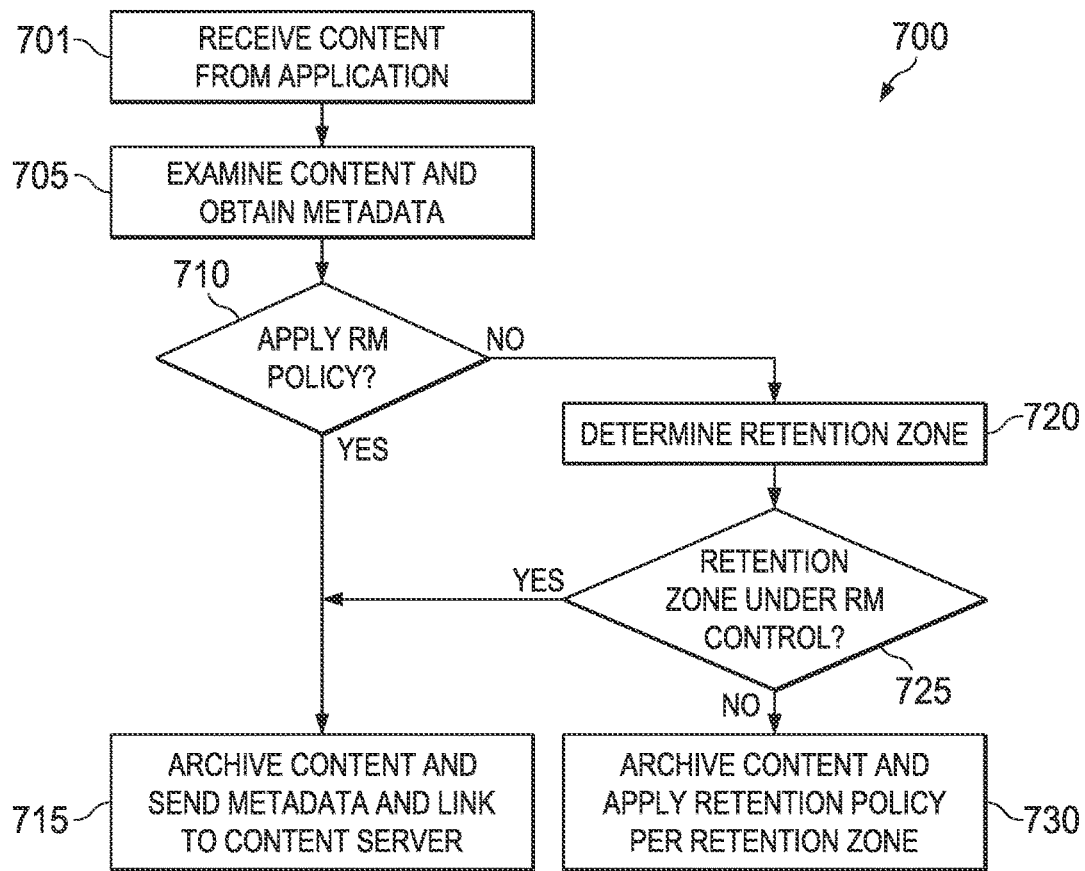
FIG. 7 is a flow chart illustrating by example one embodiment of a method for processing content utilizing the new functionality of an archive center.

FIG. 7 is a flow chart illustrating by example one embodiment of method 700 for processing, archiving, and managing content (e.g., documents and other content of an enterprise or organization that relate to the enterprise's processes) utilizing the above-described inventive systems and techniques for archiving content.

In some embodiments, method 700 may begin when an archive center receives data from an enterprise application (701). The archive center may examine the content and obtain associated properties (metadata) of the content (705). As described above, such properties may be defined per document type and may include a particular trigger or a tag.

For example, if a property "RM Policy" associated with the content indicates that a RM policy is applicable (710), the archive center may proceed to archive the content (e.g., in an unalterable and tamperproof form at a secure storage location) and upload or otherwise send the metadata and a link to the storage location to a content server as specified by the RM policy (715). In response, the records management functionality at the content server may create a content server document based on the metadata and control the retention of the archived content using the content server document (which is linked to the archived content). Otherwise, the archive center may determine an appropriate retention zone (720), perhaps based on tag(s), data source, or retention policy, and place the content in the determined retention zone. As explained above, some retention zones at the archive center may be managed by a records management functionality of a content server.

Accordingly, the archive center may determine whether the retention zone thus determined for the content is under records management control (725). If so, the archive center archives the content and uploads or otherwise sends the metadata associated with the content and a link to the storage location where the content now resides to the content server and the content server controls the records management functionality (715). If the retention zone thus determined for the content is not under records management control, the archive center archives the content and applies the appropriate retention policy per the determined retention zone, as explained above (730).

Figure 8:
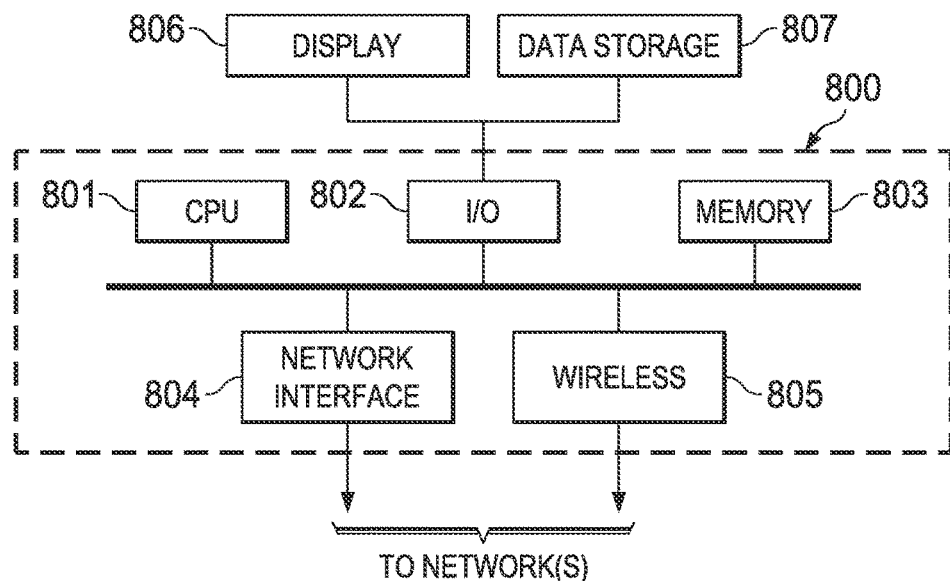
FIG. 8 depicts a diagrammatic representation of one example embodiment of a data processing system that can be used to implement embodiments disclosed herein.

FIG. 8 depicts a diagrammatic representation of one example embodiment of a data processing system that can be used to implement embodiments disclosed herein. As shown in FIG. 8, data processing system 800 may include one or more central processing units (CPU) or processors 801 coupled to one or more user input/output (I/O) devices 802 and memory devices 803. Examples of I/O devices 802 may include, but are not limited to, keyboards, displays, monitors, touch screens, printers, electronic pointing devices such as mice, trackballs, styluses, touch pads, or the like. Examples of memory devices 803 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 800 can be coupled to display 806, information device 807 and various peripheral devices (not shown), such as printers, plotters, speakers, etc. through I/O devices 802. Data processing system 800 may also be coupled to external computers or other devices through network interface 804, wireless transceiver 805, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed networked systems, components and circuits. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of this disclosure should be determined by the following claims and their legal equivalents.

What is claimed is:

1. A system for archiving content, the system comprising:
an archive center server having a processor and a non-transitory computer-readable medium storing instructions translatable by the processor;
a storage location coupled to the archive center server and configured to store content received from the archive center server;
a user interface coupled to the archive center server, the user interface configured to receive input indicative of whether a records management policy is applicable to the content;
the instructions stored on the non-transitory computer-readable medium translatable by the processor to:
determine whether the records management policy is applicable to the content,
responsive to the records management policy not being applicable to the content, retaining, by the archive center server, retention control of the content, and
responsive to the records management policy being applicable to the content, relinquishing control of the content from the archive center server to the content server by uploading to the content server the metadata associated with the content and a link to a storage location of the content.

2. The system of claim 1, wherein the input received by the user interface comprises an instruction to turn a retention management zone on or off.

3. The system of claim 1, wherein the metadata includes a property, and wherein the archive center server is configured to determine whether the records management policy is applicable to the content by determining whether the content indicates that he records management policy is applicable to a retention management zone in which the content is included.

4. The system of claim 3, wherein the user interface comprises a Content Management Interoperability Services (CMIS) interface, and wherein the input received by the user interface comprises a call to set a value of a retention management policy property of the content.

5. The system of claim 3, wherein the input received by the user interface comprises user input which defines a property of a retention management zone.

6. The system of claim 5, wherein the property comprises a retention period, the archive center server is configured to maintain retention control of the content according to a retention period value set by the input received by the user interface.

7. The system of claim 5, wherein the property comprises a location of a content server which has retention control of the content.

8. A method for archiving content, comprising:
storing, by an archive center server in a storage location maintained by the archive center server, content received from an enterprise application running on a computing device coupled to the archive center server;
receiving, by the archive center server via a user interface, input indicative of whether a records management policy is applicable to the content;
determining whether the records management policy is applicable to the content;
responsive to the records management policy not being applicable to the content, retaining, by the archive center server, retention control of the content; and
responsive to the records management policy being applicable to the content, relinquishing control of the content from the archive center server to the content server by uploading to the content server the metadata associated with the content and a link to a storage location of the content.

9. The method of claim 8, wherein the input received by the user interface comprises an instruction to turn a retention management zone on or off.

10. The method of claim 8, wherein the metadata includes a property, and wherein determining whether the records management policy is applicable to the content comprises determining whether the content indicates that the records management policy is applicable to a retention management zone in which the content is included.

11. The method of claim 10, wherein the user interface is a Content Management Interoperability Services (CMIS) interface, and wherein the input received by the user interface comprises a call to set a value of a retention management policy property of the content.

12. The method of claim 10, wherein the input received by the user interface comprises user input which defines a property of a retention management zone.

13. The method of claim 12, wherein the property comprises a retention period, the method further comprising maintaining, by the archive center server, retention control of the content according to a retention period value set by the input received by the user interface.

14. The method of claim 12, wherein the property comprises a location of a content server which has retention control of the content.

15. A computer program product for archiving content, the computer program product comprising a non-transitory computer-readable medium storing instructions translatable by a processor of an archive center computer to perform:

storing, by an archive center server in a storage location maintained by the archive center server, content received from an enterprise application running on a computing device coupled to the archive center server;

receiving, by the archive center server via a user interface, input indicative of whether a records management policy is applicable to the content;

determining whether the records management policy is applicable to the content;

responsive to the records management policy not being applicable to the content, retaining, by the archive center server, retention control of the content; and responsive to the records management policy being applicable to the content, relinquishing control of the content from the archive center server to the content server by uploading to the content server the metadata associated with the content and a link to a storage location of the content.

16. The computer program product of claim 15, wherein the input received by the user interface comprises an instruction to turn a retention management zone on or off.

17. The computer program product of claim 15, wherein the metadata includes a property, and wherein determining whether the records management policy is applicable to the content comprises determining whether the content indicates that the records management policy is applicable to a retention management zone in which the content is included.

18. The computer program product of claim 17, wherein the user interface is a Content Management Interoperability Services (CMIS) interface, and wherein the input received by the user interface comprises a call to set a value of a retention management policy property of the content.

19. The computer program product of claim 17, wherein the input received by the user interface comprises user input which defines a property of a retention management zone, and wherein the property comprises a retention period, the instructions further translatable to maintain, by the archive center server, retention control of the content according to a retention period value set by the input received by the user interface.

20. The computer program product of claim 17, wherein the input received by the user interface comprises user input which defines a property of a retention management zone, and wherein the property comprises a location of a content server which has retention control of the content.

* * * * *